US012631995B2

(12) United States Patent
Baba et al.

(10) Patent No.: US 12,631,995 B2
(45) Date of Patent: May 19, 2026

(54) FIXING RUBBING MEMBER AND FIXING APPARATUS

(71) Applicant: CANON KABUSHIKI KAISHA, Tokyo (JP)

(72) Inventors: Yusuke Baba, Kanagawa (JP); Akira Okano, Kanagawa (JP); Misa Kawashima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/002,937

(22) Filed: Dec. 27, 2024

(65) Prior Publication Data

US 2025/0231510 A1 Jul. 17, 2025

(30) Foreign Application Priority Data

Jan. 17, 2024 (JP) ................................ 2024-005503

(51) Int. Cl.
*G03G 15/20* (2006.01)

(52) U.S. Cl.
CPC ..... *G03G 15/2057* (2013.01); *G03G 15/2064* (2013.01); *G03G 2215/2035* (2013.01)

(58) Field of Classification Search
CPC ........... G03G 15/2057; G03G 15/2064; G03G 2215/2035
See application file for complete search history.

(56) References Cited

U.S. PATENT DOCUMENTS 4,104,910 A * 8/1978 Ogata ...................... G01L 1/247 73/862.53
4,200,389 A * 4/1980 Matsui ............... G03G 15/2092 432/60
4,441,417 A * 4/1984 Katayama .......... G03G 15/2092 430/124.32

(Continued)

FOREIGN PATENT DOCUMENTS

EP 0195873 B1 * 11/1989 ............. G01L 1/247
JP 2015138099 A * 7/2015

(Continued)

OTHER PUBLICATIONS

Nobuyuki Otsu, "A Threshold Selection Method from Gray-Level Histograms," SMC-9(1) IEEE Transactions on Systems, Man and Cybernetics 62-66 (Jan. 1979).

*Primary Examiner* — Sevan A Aydin
(74) *Attorney, Agent, or Firm* — Venable LLP

(57) ABSTRACT

A fixing rubbing member including a metallic base material having a plurality of first protruded portions on at least one surface, and a resin layer covering a surface of the first protruded portions of the metallic base material, in which the resin layer is provided with a plurality of second protruded portions corresponding to the plurality of respective first protruded portions, on a surface of the resin layer on an opposite side of a side that faces the metallic base material; an apex of at least one of the plurality of second protruded portions is provided with at least one depressed portion; and, when a glass sheet is pressed against the surface of the fixing (Continued)

rubbing member provided with the second protruded portions, at 0.4 MPa, at a temperature of 25° C., a rim surrounding the depressed portion comes into contact with the glass sheet.

12 Claims, 6 Drawing Sheets

(56) References Cited

U.S. PATENT DOCUMENTS

| | | | | |
|---|---|---|---|---|
| 4,977,656 | A * | 12/1990 | Lioy | B41N 7/00 226/193 |
| 11,982,961 | B2 | 5/2024 | Kawai et al. | |
| 2010/0135695 | A1* | 6/2010 | Mayuzumi | G03G 15/0233 399/168 |
| 2014/0255838 | A1* | 9/2014 | Matsuda | G03G 5/14756 399/176 |
| 2021/0341345 | A1* | 11/2021 | Hatta | G01L 1/247 |
| 2022/0372353 | A1 | 11/2022 | Tanabe et al. | |
| 2024/0210864 | A1 | 6/2024 | Kawai et al. | |

FOREIGN PATENT DOCUMENTS

| | | |
|---|---|---|
| JP | 2023-52354 A | 4/2023 |
| JP | 2023-125025 A | 9/2023 |

* cited by examiner

FIXING RUBBING MEMBER AND FIXING APPARATUS

BACKGROUND OF THE INVENTION

Field of the Invention

The present disclosure relates to a rubbing member for a fixing apparatus, and a fixing apparatus.

Description of the Related Art

Nowadays, the market for on-demand printing services is growing. On-demand printing services are for printing a required number of copies of a commercial printout, such as a catalogue, a poster, or a brochure, or for continuously printing printouts, such as various types of invoices or direct mails, after changing a part of the content for each customer. Image forming apparatuses based on an electrophotographic system, used in recent such on-demand printing, are demanded to operate at a speed higher than ever.

In order to increase the printing speed even higher, it is necessary to fix the unfixed toner image on a recording medium such as paper by applying the energy enough to fix an unfixed toner image within a short time. One example of a method for achieving such a goal is to use a fixing apparatus having a wide fixing nip, by which energy can be applied to the unfixed toner image relatively over a longer time period. The width of the fixing nip herein is the length, in a direction extending along the direction in which the recording medium is conveyed, of a portion by which a fixing rotating member, which is provided for heating an unfixed toner image, is in contact with a pressing rotating member disposed facing the fixing rotating member. Hereinafter, a fixing apparatus having a wide fixing nip will be sometimes referred to as a wide-nip fixing apparatus.

In order to ensure excellent appearance of images in such a wide-nip fixing apparatus, it is extremely important to prevent slippage between the fixing rotating member and the recording medium, as well as slippage between the pressing rotating member and the recording medium.

Furthermore, there is a known fixing apparatus including:

(i) an endless belt that is rotatable (fixing rotating member);

(ii) a pressing member forming a nip portion by which a recording medium is conveyed, by nipping the recording medium with the belt; and (iii) a rubbing member configured to slide along the inner peripheral surface of the belt in the nip portion, with a lubricant therebetween.

The lubricant is used so that the rubbing member can slide stably on the inner surface of the belt. Without the lubricant in the nip portion, the rotation of the belt may become unstable, and friction occurs between the inner surface of the belt and the rubbing member, and may shorten the lifetime of the apparatus.

In such a fixing apparatus, in order to suppress the slippage described above, it is necessary to set a sliding resistance between the rubbing member and the inner peripheral surface of the belt member sufficiently lower than the friction forces between the recording medium and the belt member and the recording medium and the pressing member.

Japanese Patent Application Publication No. 2023-125025 discloses using a rubbing member in a configuration of a fixing apparatus such as that described above, the rubbing member including: a base material layer having a plurality of projections projecting toward the inner peripheral surface of the belt and provided on a side sliding along the belt; and a sliding layer provided in a manner covering the surface of the base material layer on the side sliding along the belt. In the sliding layer, the part on the tip of each of the plurality of respective projections delineates a curved surface at a curvature radius R of 300 μm to 850 μm. Japanese Patent Application Publication No. 2023-125025 also discloses that, by using such a rubbing member, it is possible to reduce the sliding resistance between the rubbing member and the inner peripheral surface of the belt.

SUMMARY OF THE INVENTION

According to examinations carried out by the inventors of the present disclosure, the fixing apparatus according to Japanese Patent Application Publication No. 2023-125025 is effective in reducing the sliding resistance between the rubbing member and the inner peripheral surface of the belt member to a certain extent, but it has been found out that, at the time of starting driving (rotating) the fixing rotating member that is not moving, the sliding resistance between the rubbing member and the inner peripheral surface of the belt increases, and the fixing rotating member and the recording medium or the pressing rotating member and the recording medium may slip with respect to each other. Furthermore, there is a tendency that an increased sliding resistance results in a grater initial driving torque required in the fixing apparatus to start rotating the moving fixing rotating member that is not moving.

At least one aspect of the present disclosure is directed to providing a fixing rubbing member with a less sliding resistance against the inner peripheral surface of the fixing rotating member even at the time of start driving the fixing rotating member that is not moving. Furthermore, at least one aspect of the present disclosure is also directed to provide a fixing apparatus requiring less initial driving torque to start driving the fixing rotating member that is not moving.

According to at least one aspect of the present disclosure is directed to providing a fixing rubbing member comprising a metallic base material having a plurality of first protruded portions on at least one surface and a resin layer covering a surface of the first protruded portions of the metallic base material, wherein the resin layer is provided with a plurality of second protruded portions corresponding to the plurality of respective first protruded portions, on a surface of the resin layer on an opposite side of a side that faces the metallic base material, an apex of at least one of the plurality of second protruded portions is provided with at least one depressed portion, and when a glass sheet is pressed against the surface of the fixing rubbing member provided with the plurality of second protruded portions, at a pressure 0.4 MPa, at a temperature of 25° C., a rim surrounding the depressed portion comes into contact with the glass sheet.

Also provided according to at least one aspect of the present disclosure is a fixing apparatus configured to fix an unfixed toner image carried on a recording medium onto the recording medium, the fixing apparatus including: a fixing rotating member; a pressing rotating member disposed facing the fixing rotating member and forming a nip portion with the fixing rotating member; a rubbing member disposed on an inner side of the fixing rotating member, and having a sliding surface enabled to slide on the inner peripheral surface of the fixing rotating member with a lubricant disposed between the sliding surface and the inner peripheral surface; a backup member disposed on the inner side of the fixing rotating member, in a manner nipping the rubbing member and the fixing rotating member with the pressing rotating member, and providing backing to the rubbing member; and a heater configured to heat the fixing rotating member, in which the rubbing member is the fixing rubbing member described above, and is disposed in such a manner that a surface of the fixing rubbing member on a side having the plurality of second protruded portions faces the inner peripheral surface of the fixing rotating member.

According to at least one aspect of the present disclosure, it is possible to achieve a fixing rubbing member with a less sliding resistance against the inner peripheral surface of the fixing rotating member, even at the time of starting driving the fixing rotating member that is not moving. Furthermore, according to at least one aspect of the present disclosure, it is possible to achieve a fixing apparatus requiring less initial driving torque at the time of starting driving the fixing rotating member that is not moving.

Further features of the present invention will become apparent from the following description of exemplary embodiments with reference to the attached drawings.

DESCRIPTION OF THE EMBODIMENTS

Figure 1:
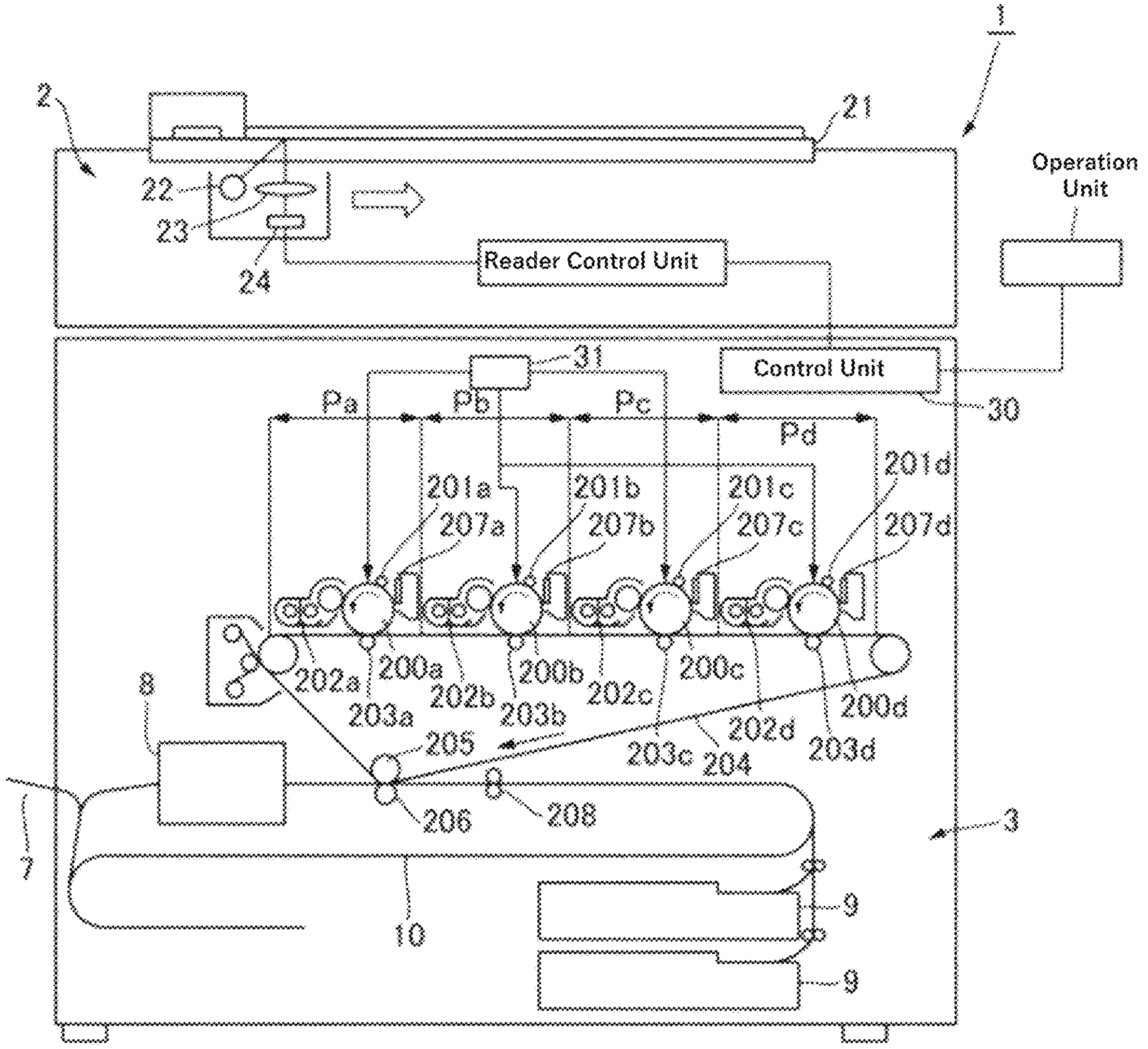
FIG. 1 is a sectional view illustrating a schematic configuration of an electrophotographic image forming apparatus according to one aspect of the present disclosure.

In the present disclosure, "from XX to YY" or "XX to YY" indicating a numerical range means a numerical range including a lower limit and an upper limit that are end points unless otherwise specified. In a case where numerical ranges are described in stages, an upper limit and a lower limit of each numerical range can be combined as desired. Furthermore, in the present disclosure, for example, description such as "at least one selected from the group consisting of XX, YY, and ZZ" means any of XX, YY, ZZ, a combination of XX and YY, a combination of XX and ZZ, a combination of YY and ZZ, or a combination of XX, YY, and ZZ.

Usually, lubricant such as grease is placed between the inner peripheral surface of a fixing rotating member and a sliding surface of a rubbing member, with an intention for achieving improved slidability. However, at the time of starting to drive the fixing rotating member that is not moving, the lubricant is sometimes pushed out of an abutting region between the inner peripheral surface of the fixing rotating member and the sliding surface of the rubbing member, by a physical impact at the time of driving, for example. As a result of this, the sliding resistance between the sliding surface of the rubbing member and the inner peripheral surface of the fixing rotating member may become extremely high.

As a result of further development efforts for addressing this issue, the inventors of the present disclosure has found out that, with a fixing rubbing member having the configuration described below, lubricant can be kept within the contact region between the rubbing member and the inner peripheral surface of the fixing belt even at the time of starting driving the fixing rotating member, and as a result, it is possible to prevent an increase of the sliding resistance between the sliding surface of the rubbing member and the inner peripheral surface of the fixing rotating member; to suppress slippage between the fixing rotating member and the recording medium and slippage between the pressing rotating member and the recording medium even from the beginning of the image formation; and to suppress an increase in the initial driving torque.

Configuration

A fixing rubbing member including: a metallic base material having a plurality of first protruded portions on at least one surface; and a resin layer covering a surface of the first protruded portions of the metallic base material, in which the resin layer is provided with a plurality of second protruded portions corresponding to the plurality of respective first protruded portions, on a surface of the resin layer on an opposite side of a side that faces the metallic base material; an apex of at least one of the plurality of second protruded portions is provided with at least one depressed portion; and when a glass sheet is pressed against the surface of the fixing rubbing member provided with the second protruded portions at 0.4 MPa, at a temperature of 25° C., a rim surrounding the depressed portion comes into contact with the glass sheet.

One aspect of a fixing rubbing member according to the present disclosure and one aspect of a fixing apparatus according to the present disclosure will now be explained with reference to drawings.

Figure 2:
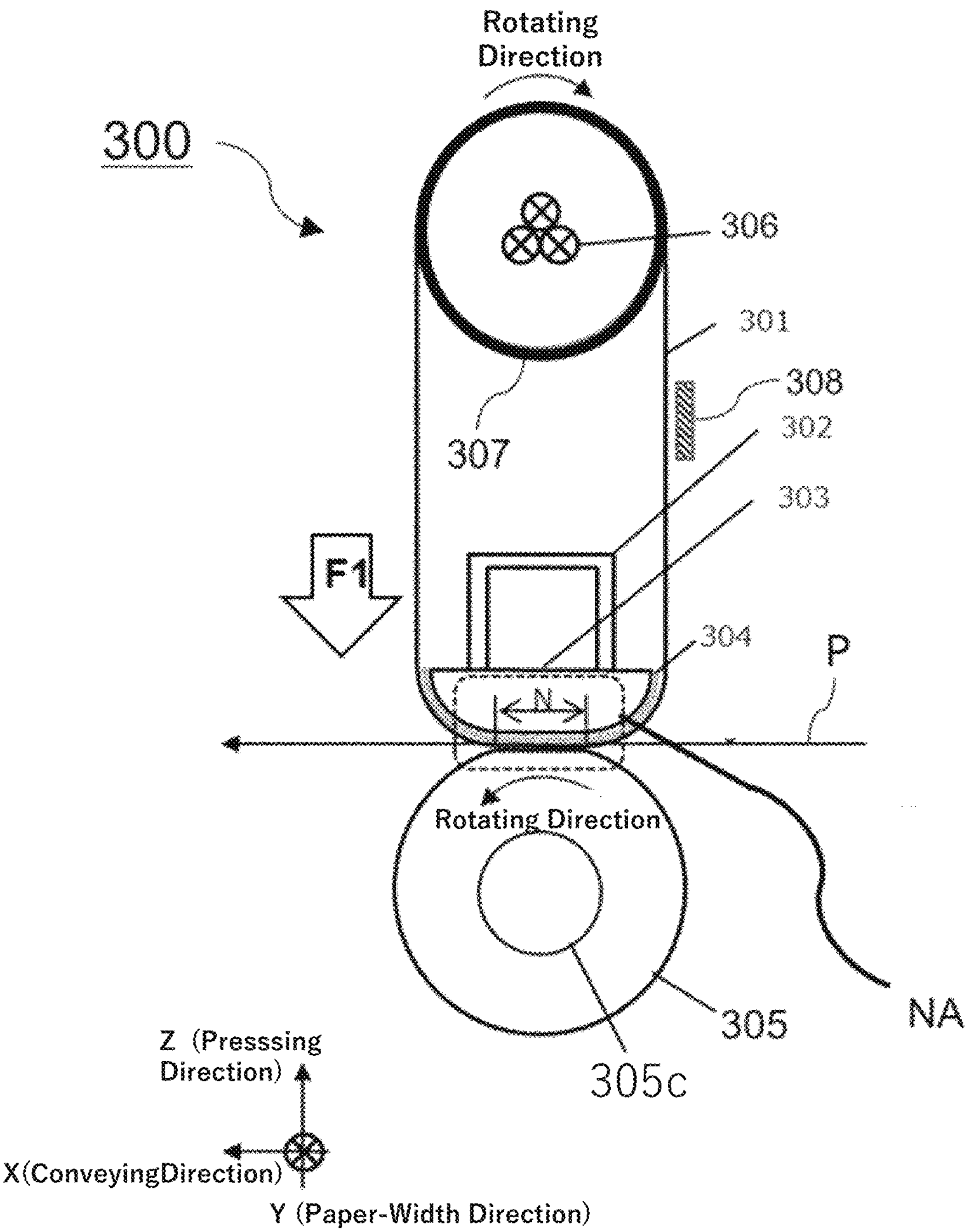
FIG. 2 is a sectional view illustrating a schematic configuration of a fixing apparatus according to one aspect of the present disclosure.
Figure 3:
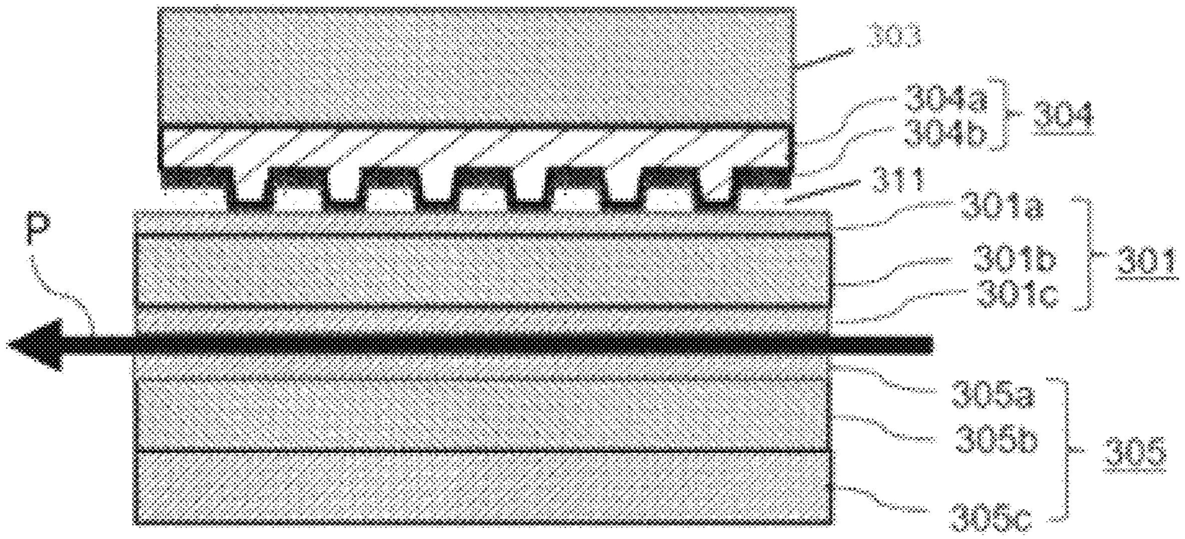
FIG. 3 is an enlarged sectional view of a portion nearby the nip portion, in the fixing apparatus illustrated in FIG. 2.

FIGS. 2 and 3 are schematic sectional views for explaining a fixing apparatus 300 according to one aspect of the present disclosure. In FIG. 2, an X direction corresponds to the direction in which a recording medium (not illustrated) is conveyed; a Y direction corresponds to a direction intersecting with the direction in which the recording medium is conveyed (the depth direction with respect to the paper surface); and the Z direction corresponds to a pressing direction that is a direction in which the recording medium is pressed in a nip portion N. In this embodiment, the X direction, the Y direction, and the Z direction are directions that are orthogonal to one another. FIG. 3 is an enlarged sectional view of an area NA including the nip portion N, as surrounded by a dotted line in FIG. 2.

The fixing apparatus 300 at least includes a fixing rotating member 301, a pressing stay 302, a pressing pad (hereinafter, also simply referred to as a "pad") 303, a rubbing member 304, a pressing rotating member 305, a heater 306, a heating roller 307, and a thermistor 308. The fixing rotating member 301 may be an endless belt, for example. The pressing rotating member 305 forms the nip portion N for conveying a recording medium, by coming into abutment against the outer peripheral surface of the fixing rotating member 301 and nipping the recording medium with the fixing rotating member 301.

The rubbing member 304 slides along the inner peripheral surface of the fixing rotating member 301 across the nip portion N. The pad 303 that is a backup member is disposed in such a manner that the rubbing member 304 and the fixing rotating member 301 are nipped between the pad 303 and the pressing rotating member 305, on the inner side of the fixing rotating member 301, and provides backing to the rubbing member 304. The rubbing member 304 is disposed in a manner covering a surface of the pad 303, the surface being a surface on the side facing the fixing rotating member 301 (hereinafter, also referred to as an "outer surface"). The rubbing member 304 is mounted in a manner at least covering a part of the outer surface of the pad 303, the part being a part corresponding to the nip portion N. The rubbing member 304 may be provided either to the entire outer surface of the pad 303 or to the part corresponding to the nip portion N.

The pressing stay 302 is disposed on the opposite side of the nip portion N with the pad 303 disposed therebetween, on the inner side of the fixing rotating member 301, and supports the pad 303. The heating roller 307 is positioned on the inner side of the fixing rotating member 301 in a manner stretching the fixing rotating member 301, and heats the fixing rotating member 301. The thermistor 308 serving as a temperature detection member detects the temperature of the fixing rotating member 301.

The fixing rotating member 301 is thermally conductive and heat-resistant, and has a circular tubular shape having a thin thickness. In this aspect, the fixing rotating member 301 includes, as illustrated in FIG. 3, the base layer 301*a*, an elastic layer 301*b* covering the outer peripheral surface of the base layer 301*a*, and a separation layer 301*c* covering the outer peripheral surface of the elastic layer 301*b*. The base layer 301*a* may be a polyimide resin (PI) layer having a thickness of 80 μm, for example. The elastic layer 301*b* may be a layer containing a silicone rubber, with a thickness of 300 μm, for example. The separation layer 301*c* may be a fluorine resin layer having a thickness of 30 μm, for example. Examples of the fluorine resin includes tetrafluoroethylene, perfluoroalkoxyethylene copolymer resin (PFA) and fluorinated ethylene propylene (FEP). The fixing rotating member 301 is stretched across the pad 303 and the heating roller 307. The outer diameter of the fixing rotating member 301 may be 150 mm, for example.

The pad 303 is disposed in a manner facing the pressing rotating member 305 with the fixing rotating member 301 therebetween, on the inner side of the fixing rotating member 301, and forms the nip portion N for nipping and conveying the recording medium between the fixing rotating member 301 and the pressing rotating member 305. In this embodiment, the pad 303 is a substantially plate-shaped member elongated in a width direction of the fixing rotating member 301 (a longitudinal direction intersecting with the rotating direction of the fixing rotating member 301, a direction of the rotational axis of the heating roller 307). With the pad 303 being pressed by the pressing rotating member 305 with the fixing rotating member 301 therebetween, the nip portion N is formed. Liquid-crystal polymer (LCP) resin may be used as the material of the pad 303, for example. The rubbing member 304 is disposed between the pad 303 and the fixing rotating member 301. The rubbing member 304 will be described later in detail.

The pad 303 is supported by the pressing stay 302 that is a support member disposed on the inner side of the fixing rotating member 301. The pressing stay 302 is disposed on the opposite side of the pressing rotating member 305 with respect to the pad 303, and supports the pad 303. The pressing stay 302 is a reinforcement member that is rigid and long in the longitudinal direction of the fixing rotating member 301, and provides backing to the pad 303 by coming into abutment against the pad 303. In other words, the pressing stay 302 is configured to reinforce the pad 303 to ensure a pressing force to be exerted in the nip portion N when the pressing rotating member 305 presses the pad 303.

The pressing stay 302 is made of a metal such as stainless steel, and has a substantially rectangular cross section (traversal cross section) in a direction orthogonal to the longitudinal direction of the pressing stay 302 intersecting with the rotating direction of the fixing rotating member 301. For example, it is preferable to ensure the strength of the pressing stay 302 by using a drawn stainless-steel material (e.g., SUS 304) having a thickness of 3 mm, to form a traversal cross section having a substantially square hollow shape. The substantially rectangular traversal cross section of the pressing stay 302 may be achieved as a combination of a plurality of steel plates that are fixed to one another by welding, for example. Furthermore, the material of the pressing stay 302 is not limited to stainless steel as long as the strength can be ensured.

The heating roller 307 is disposed on the inner side of the fixing rotating member 301, and stretches the fixing rotating member 301 together with the pad 303. The heating roller 307 is a cylindrical member formed of a metal such as aluminum or stainless steel, and the heater 306 for heating the fixing rotating member 301 is disposed inside the heating roller 307. The heater 306 may be any heater capable of heating the heating roller 307, and examples of the heater include a halogen heater and a carbon heater. The heater 306 heats the heating roller 307 to a predetermined temperature.

The heating roller 307 has its rotational center at one end or near the center thereof in the longitudinal direction, and also serves as a steering roller that controls the position of the fixing rotating member 301 in the main scanning direction, by rotating with respect to the fixing rotating member 301 to create a tension difference between the parts of the fixing rotating member 301 leading to and subsequent to the heating roller 307. The heating roller 307 is also biased by a spring that is supported on a frame not illustrated, and serves as a tension roller imparting a predetermined level of tension to the fixing rotating member 301.

In this embodiment, the heating roller 307 is made of a stainless-steel pipe having a thickness of 1 mm, for example. Furthermore, when a halogen heater is used as the heater 306, the number of the halogen heaters may be one, but preferably more than one, in view of controlling the temperature distribution in the longitudinal direction (rotational axis direction) of the heating roller 307. Each of a plurality of halogen heaters has a light distribution that is different from the others in the longitudinal direction. An ON-ratio is controlled on the basis of the size of the recording medium. In this embodiment, three halogen heaters are provided as the heater 306.

The fixing rotating member 301 is heated by the heating roller 307 that is heated by the heater 306, and is controlled to a predetermined target temperature depending on the type of a recording medium on the basis of the temperature detected by the thermistor 308. The thermistor 308 is disposed in a manner facing the outer peripheral surface of the fixing rotating member 301 near the center of where a recording medium of every size for which the fixing apparatus 300 can fix an image, in the width direction of the fixing rotating member 301. The thermistor 308 then detects the temperature of the fixing rotating member 301, and a control unit 30 controls the power to be supplied to the heater 306 to bring the temperature detected by the thermistor 308 to a target temperature. The thermistor 308 may be a non-contact sensor disposed at the proximity of the outer peripheral surface of the fixing rotating member 301, or a contact sensor disposed in contact with the outer peripheral surface of the fixing rotating member 301.

The pressing rotating member 305 is a driver roller giving a driving force to the fixing rotating member 301 by rotating in abutment with the outer peripheral surface of the fixing rotating member 301. It is also possible to configure the heating roller 307 as a driver roller for the fixing rotating member 301, by using a driving source (not illustrated) such as a motor to drive the heating roller 307 in rotation. In other words, the driver roller for the fixing rotating member 301 may be at least one selected from the group consisting of the pressing rotating member 305 and the heating roller 307. The pressing rotating member 305 includes a cored bar (shaft) 305*c*, an elastic layer 305*b* provided on the outer periphery of the cored bar 305*c*, and a separation layer 305*a* covering the outer periphery of the elastic layer 305*b*. As the cored bar 305*c*, a roller made of stainless steel and having a diameter of 72 mm may be used, for example. The elastic layer 305*b* may be a conductive elastic layer including a silicone rubber at a thickness of 8 mm, for example. Furthermore, the separation layer 305*a* may be a fluorine resin layer having a thickness of 100 μm. One example of the fluorine resin includes tetrafluoroethylene, perfluoroalkoxyethylene copolymer resin (PFA). The pressing rotating member 305 is rotatably supported on the frame (not illustrated) of the fixing apparatus 300, has one end provided with a gear (not illustrated) fixed thereto, and is connected to and driven by a driving source (not illustrated) such as a motor, via the gear.

The fixing apparatus 300 heats an unfixed toner image while conveying a recording medium P carrying the unfixed toner image by nipping the recording medium in the nip portion N formed between the fixing rotating member 301 and the pressing rotating member 305. In this manner, the fixing apparatus 300 fixes the toner onto the recording medium P while conveying the recording medium P by nipping. Therefore, the fixing apparatus 300 needs to have both of a heating and pressing function, and a function for conveying recording medium P. A driving source, not illustrated, presses the pressing rotating member 305 against the rubbing member 304, with the fixing rotating member 301 therebetween. In this embodiment, the pressing force (NF) exerted in the nip portion N at the time of image formation, that is, the load exerted to the pad 303 and the pressing rotating member 305 is 1600 N; and the width of the nip portion N in the X direction (the direction in which the recording medium is conveyed) is set to 24.5 mm, and the width in the Y direction (the width direction of the recording medium) is set to 326 mm.

The length of the nip portion N in the conveying direction (X direction) (nip width) is defined by the rubbing member 304 being pressed by the pressing rotating member 305 with the fixing rotating member 301 therebetween. The pressing force (F1) in the nip portion N is not limited to a particular force, but is preferably strong enough to allow the fixing rotating member 301 to press the pressing rotating member sufficiently so that neither the fixing rotating member nor the pressing rotating member slips with respect to the recording medium P passing through the nip portion N. As an example, the load exerted to the pad 303 and the pressing rotating member 305 is preferably to set 900 N or more, in particular, 1600 N or more.

Rubbing Member

Figure 4:
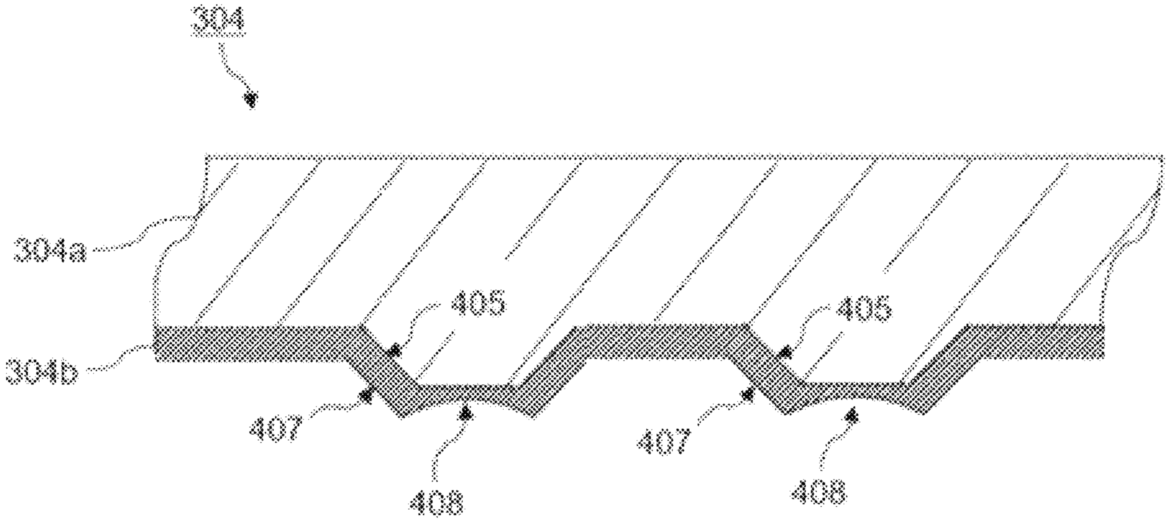
FIG. 4 is an enlarged sectional view of a part of a rubbing member according to one aspect of the present disclosure.

The rubbing member 304 will now be explained with reference to FIGS. 3 and 4. FIG. 3 is an enlarged sectional view of an area NA including the nip portion N, surrounded by a dotted line in FIG. 2. FIG. 4 is a partial enlarged view of the rubbing member 304. In the example illustrated, the rubbing member 304 is fixed to the pressing stay 302 using screws (not illustrated), with the pad 303 therebetween. In this embodiment, the rubbing member 304 and the pad 303 are provided as separate members, but may be integrated with each other.

The rubbing member 304 includes a base material 304*a* one surface of which is provided with a plurality of first protruded portions 405, and a resin layer 304*b* covering the surface of the base material 304*a* on the side provided with the first protruded portions 405. The resin layer 304*b* has a plurality of second protruded portions 407 corresponding to the plurality of respective first protruded portions 405. Each of the second protruded portions 407 has at least one depressed portion 408, at the apex thereof, that is, in a portion of the second protruded portion 407 nearest to the inner peripheral surface of the fixing rotating member 301.

The rubbing member 304 also satisfies following Requirement 1.

Requirement 1

Figure 5:
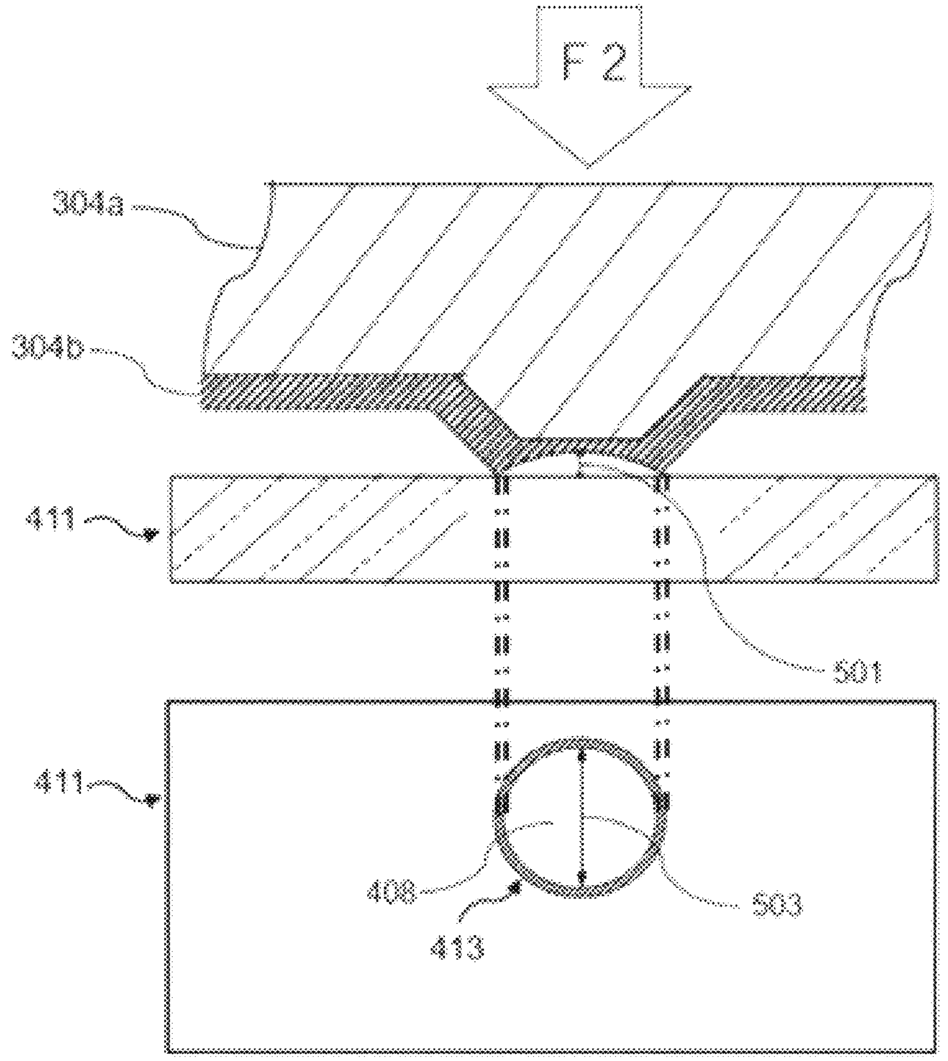
FIG. 5 is a schematic for explaining a condition of the rubbing member according to one aspect of the present disclosure being pressed against a glass sheet at a predetermined pressure.

In the environment of a temperature of 25° C., a transparent glass sheet 411 is disposed in a manner facing the surface of the rubbing member 304 on the side provided with the second protruded portions 407, and a force at a pressure 0.4 MPa is exerted to the rear side of the base material 304*a* of the rubbing member 304, that is, to the side opposite to the side provided with the first protruded portions 405, in the direction of the arrow F2, to press the rubbing member 304 against the glass sheet 411, as illustrated in FIG. 5. While maintaining this state, the glass sheet 411 and the rubbing member 304 are observed, from the opposite side of the glass sheet 411, being opposite to the side facing the rubbing member 304. At this time, rims 413 surrounding the respective depressed portions 408 that are provided at the apexes of the respective second protruded portions 407 come into contact with the glass sheet 411.

A method of observation is not limited to a particular method, but the observation is made using a digital microscope, as an example. With this, the rims 413 surrounding the respective depressed portions 408 on the apexes of the respective second protruded portions 407 being in contact with the glass sheet 411 can be observed. As a method for making more specific observations, for example, a digital microscope is caused to capture an image of how the glass sheet and the rubbing member are in contact. Then using image processing software, for example, a binarized image enabled to distinguish a contact region and a non-contact region is created from the captured image. From this binarized image, it is possible to make an observation that the rims 413 surrounding the respective depressed portions 408 on the apexes of the respective second protruded portions 407 are in contact with the glass sheet 411. For the binarization, for example, "Otsu's method" disclosed in IEEE Transactions on SYSTEMS, MAN AND CYBERNETICS, vol. SMC-9, No. 1, January 1979, pp 62-66 may be used.

Base Material

It is preferable for the base material 304*a* to have a strength and heat resistance enough not to become deformed even when a pressing force pressing the fixing rotating member 301 against the pressing rotating member 305 is exerted. Therefore, as the material of the base material 304*a*, a metal is preferable, and specific examples of the metal include stainless steel, aluminum, aluminum alloy, nickel, or nickel alloy. Specifically, as one example, stainless steel (for example, SUS 304) having a thickness of 1.3 mm may be used. The thickness of the base layer herein is the thickness of the part without the first protruded portions 405.

The plurality of first protruded portions 405 form a part of the base material 304*a*. From the viewpoint of achieving a uniform pressure across the nip portion N, it is preferable for the first protruded portion 405 to be provided to the nip portion N in plurality along the direction in which the recording medium is conveyed (X direction), and also in plurality along a direction intersecting with such a conveying direction (Y direction).

Each of the plurality of first protruded portions 405 preferably has a shape of a circular truncated cone. The shape is not limited to a circular truncated cone, as long as a sufficient amount of lubricant 311 for reducing the starting torque of the fixing apparatus can be retained, but it is preferable for the diameter of the bottom surface to be larger than the diameter of the top surface. There is also no limitation in the height, but it is preferable for the height to be 100 μm or more also for the purpose of retaining a sufficient amount of lubricant 311. There is no limitation in the angle of the hypotenuse either, but an angle of 30° or more is preferable.

A method for manufacturing the base material 304*a* having the plurality of first protruded portions is not limited to a particular method, and examples of the manufacturing method include chemical etching and pressing.

Resin Layer

The resin layer 304*b* covers the surface of the base material 304*a* on the side having the plurality of first protruded portions 405. On the surface on the opposite side of the side facing the base material 304*a* of the resin layer 304*b* (hereinafter, also referred to as an "outer surface"), the second protruded portions 407 are provided correspondingly to the plurality of respective first protruded portions 405. At this time, the second protruded portions 407 corresponding to the respective first protruded portions 405 mean protruded portions formed on the outer surface of the resin layer 304*b*, by covering the surface of the first protruded portions 405.

With the plurality of second protruded portions 407 formed as the outer surface of the resin layer 304*b* on the surface of the rubbing member 304, provided on the side facing the inner peripheral surface of the fixing rotating member 301, it is possible to reduce the size of the contact area between the rubbing member 304 and the inner peripheral surface of the fixing rotating member 301, so that the sliding resistance between the rubbing member 304 and the inner peripheral surface of the fixing rotating member 301 can be reduced.

Furthermore, with the rubbing member 304 satisfying the requirement described above, in the fixing apparatus that is not moving, the lubricant 311 can be stably retained in the contact region between the second protruded portions 407 and the inner peripheral surface of the fixing rotating member 301, even with the rubbing member 304 pressed against the inner peripheral surface of the fixing rotating member 301. As a result, it is possible to prevent an increase in the starting torque of the fixing apparatus.

The material of the resin layer is not limited to a particular material, but a resin having excellent wear resistance and excellent slidability on the inner peripheral surface of the fixing rotating member 301 is preferable. A specific example includes polyether ether ketone (PEEK).

The depressed portion 408 is a region retaining the lubricant 311 that exerts the effect of suppressing the starting torque. Therefore, the depth 501 of the depressed portion is preferably 1.0 μm or more, and, more specifically 1.5 μm or more, and 4.0 μm or more is even preferable, for example.

As to the upper bound in the depth of the depressed portion, the upper bound is not limited to a particular depth, as long as a depressed portion capable of holding lubricant 311 can be ensured at the apex of the second protruded portion, with the rubbing member in the fixing apparatus abutting against the inner peripheral surface of the fixing rotating member, but may be preferably set to 10.0 μm or less, and more particularly, 6.0 μm or less, for example.

Therefore, the preferable depth range of the depressed portion 408 is a range from 1.0 μm to 10.0 μm, and more particularly, 1.0 μm to 6.0 μm, for example.

The depth of the depressed portion 408 can be measured using a method of extracting a height profile in two-dimensional directions, measured by a three-dimensional shape measurement instrument, for example. As the three-dimensional shape measurement instrument, "One-shot 3D Measuring Macroscope VR-3200" (Product Name; manufactured by KEYENCE CORPORATION) may be used, for example.

Furthermore, an area-corresponding diameter 503 of the area surrounded by the rims 413 on the depressed portion 408 is not limited to any particular diameter, as long as the depressed portion 408 can retain a sufficient amount of lubricant 311 for reducing the starting torque of the fixing apparatus, but the range from 20 μm to 600 μm is preferable, and a range from 50 μm to 500 μm is particularly preferable, and a range from 80 μm to 450 μm is even more preferable, for example.

Figure 6:
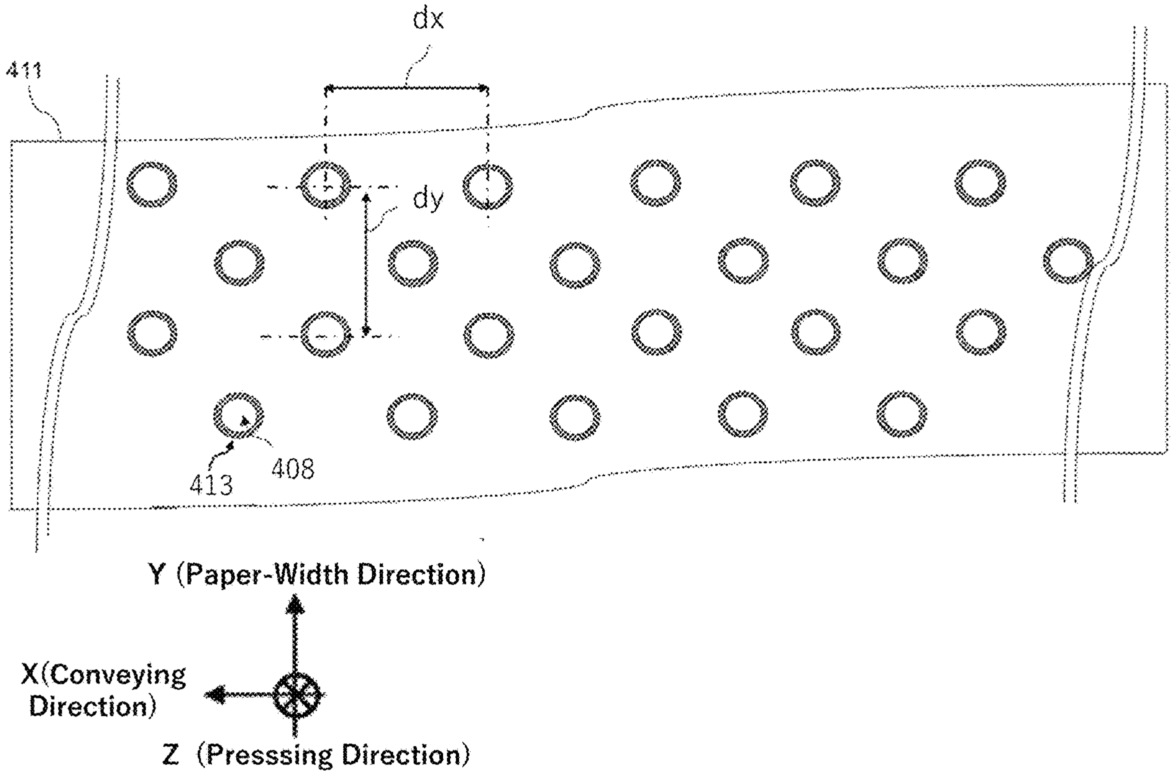
FIG. 6 is a schematic for explaining a distribution of contact regions between the glass sheet and the rubbing member when the rubbing member according to one aspect of the present disclosure is pressed against the glass sheet at a predetermined pressure.

The second protruded portion 407 is provided to the nip portion N in plurality along the conveying direction of the recording medium P (X direction), and also in plurality along the direction intersecting with the X direction (Y direction). As a specific example, FIG. 6 illustrates one form of the abutment between the glass sheet 411 and the rubbing member 304 observed through the glass sheet 411 from the opposite side of the side facing the rubbing member, when the outer surface of the rubbing member 304 is pressed against the glass sheet 411 by exerting a pressure of 0.4 MPa, as stipulated in the requirement above. As illustrated in FIG. 6, the rim 413 surrounding the depressed portion 408 is observed in plurality, in each of the X direction and the Y direction. The number of the rims 413 observed at the time is not limited to a particular number. Establishing a square-shaped observation area each side of which has a length of 1 cm on the glass sheet 411, for example, the number of the rims 413 around the respective depressed portions 408 observed in the square-shaped observation area is preferably 50 to 500, particularly preferably 75 to 400, and even more preferably 100 to 200. Furthermore, the ratio of the total areas surrounded by the outermost lines corresponding to the respective rims 413 surrounding the respective depressed portions 408 (hereinafter, also referred to as "surrounded areas") with respect to the observation area is preferably 5% to 80%, particularly preferably 10% to 60%, and even more preferably 15% to 40%.

Rubbing Member Manufacturing Method

One example of a rubbing member manufacturing method according to the present disclosure includes a method that includes following Step A to Step C.

Step A: Prepare a base material 304a having the first protruded portions 405 on one surface. Such a base material can be manufactured by chemical etching or pressing, for example.

Figure 7A:
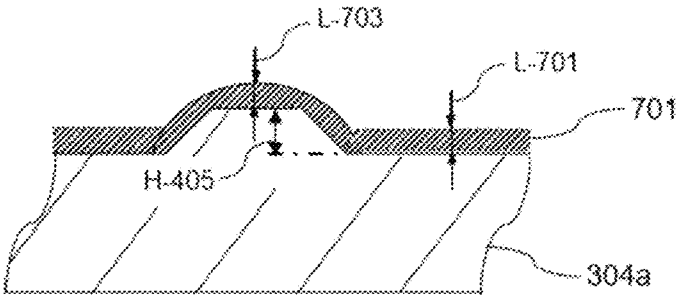
FIGS. 7A and 7B are schematics for explaining one method of manufacturing the rubbing member according to one aspect of the present disclosure.

Step B: Form a resin layer (701 in FIG. 7A) on the surface of the base material 304a prepared at Step A, on the side provided with the first protruded portions 405. The method for forming the resin layer is not limited to a particular method, but examples of the method include following Methods (i) and (ii).

Method (i): A method of forming the resin layer 701 by applying a resin solution containing the resin for forming the resin layer 304b dissolved in an appropriate solvent, to form a film of the resin solution on the target surface, and then drying the film.

Method (ii): A method of forming the resin layer 701 by applying a dispersion liquid of the resin for forming the resin layer 304b, to form a film of the dispersion liquid, and then by drying and sintering the film.

At Step B, a thickness L-701 of the resin layer 701 on the base material 304a in the portion without the first protruded portions 405 is not limited to a particular thickness, but preferably is a such a thickness allowing the protruded portions (second protruded portions) corresponding to the first protruded portions 405 of the base material 304a to be formed on the outer surface of the resin layer 701. Specifically, for example, the thickness L-701 of the resin layer 701 is preferably smaller than the height of the first protruded portions 405 (H-405 in FIG. 7A), that is, H-405>L-701. It is also preferable for the resin layer 701 to completely cover the first protruded portions of the base material 304a. Furthermore, in order to facilitate formation of the depressed portions 408 at the apexes of the respective second protruded portions, the maximum thickness (L-703) of the resin layer covering the first protruded portions 405 is preferably set to 5 μm to 100 μm, and particularly preferably 10 μm to 50 μm for example. Note that L-701 and L-703 may be the same or different.

Step C: Form a depressed portion 408 at the apex of each of the second protruded portions, having been formed correspondingly to the respective first protruded portions of the resin layer 701, to achieve the resin layer 304b according to the present disclosure.

Figure 7B:
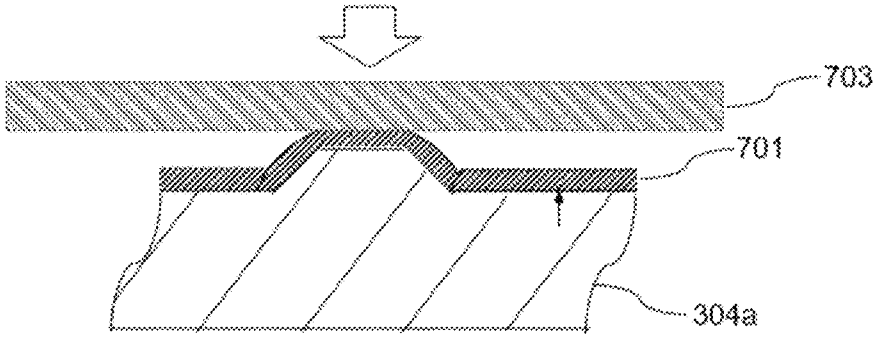

One example of the method of forming the depressed portion at the apex of each of the second protruded portions at Step C includes a method of pressing a press sheet 703 against the resin layer 701 on the apexes of the respective second protruded portions 407 at a predetermined pressure, as illustrated in FIG. 7B, and subjecting to a thermal treatment at a temperature equal to or higher than the glass transition temperature of the resin that forms the resin layer and lower than the melting point, particularly preferably, within a temperature equal to or higher than the glass transition temperature+10° C. and lower than the melting point thereof. One possible reason why the depressed portion is formed on the apex of the second protruded portion with this method is follows. By pressing the apexes of the second protruded portions at the temperature described above, the resin layer moves and the second protruded portions flatten, and the apex of each of the second protruded portions comes to have a diameter larger than the diameter of the corresponding first protruded portion. Because the resin layer has a lower elastic modulus than that of the base material, once the pressure is released, the second protruded portions each with a diameter larger than that of the corresponding first protruded portion goes through a greater elastic deformation in the height direction, so that the depressed portion is formed.

Specifically, for example, assuming that the resin layer 701 made of polyether ether ketone (PEEK: with a glass transition temperature at 143° C., and the melting point at 343° C.) has a storage elastic modulus of 0.2 GPa at 25° C., and that the maximum thickness L-703 of the second protruded portions is 30 μm, a depressed portion having a depth 501 of 2 μm can be formed at the apex of each of the second protruded portions by subjecting to thermal treatment at a temperature of 200° C. for 10 minutes while pressing a press sheet against the apexes of the respective second protruded portion at a pressure of 4 MPa.

The depth 501 of the depressed portion can be made larger (deeper) by using a resin having a higher elastic modulus at the pressing temperature to form the resin layer, for example.

In the rubbing member according to the present disclosure, it is preferable for the resin layer 304b to have an elastic modulus (storage elastic modulus) E'(200) at a temperature of 200° C. lower than the elastic modulus (storage elastic modulus) E'(25) at a temperature of 25° C. by a factor of one tenth or more. Particularly, it is preferable for E'(25) to be 2.5 GPa to 4.0 GPa, and E'(200) to be 0.06 times to 0.13 times E'(25).

Figure 8:
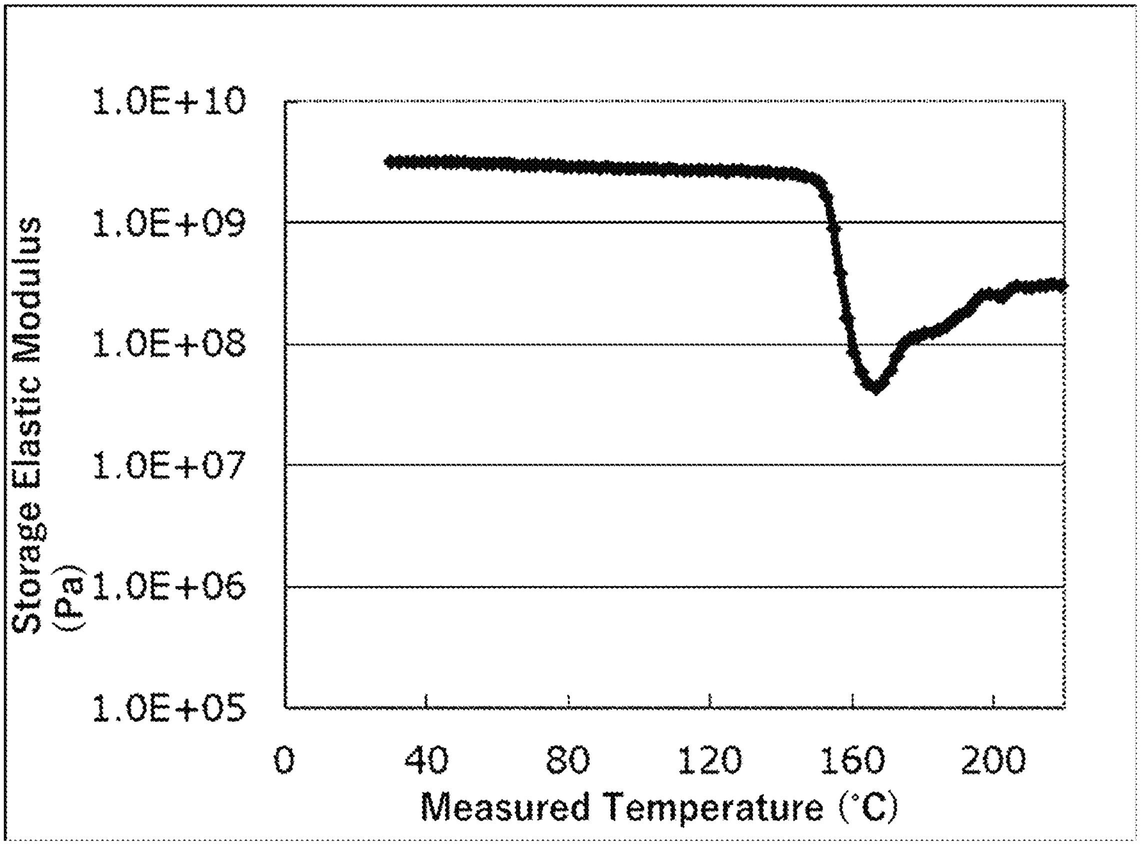
FIG. 8 is a profile indicating temperature dependency of a storage elastic modulus of polyether ether ketone.

By controlling the elastic modulus of the rubbing member in the manner described above, it is possible to ensure a sufficient depth in the depressed portion 408 of the apex of each of the second protruded portions at a temperature of 25° C. By contrast, at 200° C., which is near the fixation temperature of an unfixed toner image, the elastic modulus of the resin layer drops, and the elastic layer is elastically deformed by the pressing force of the rubbing member 304 being pressed against the inner peripheral surface of the fixing rotating member 301. Therefore, the depths of the depressed portions 408 become shallower. While the fixing apparatus is in operation and the fixing rotating member 301 is rotating stably, a layer of the lubricant 311 is formed stably between the sliding surface of the rubbing member 304 and the inner peripheral surface of the fixing rotating member, and therefore, the depressed portions 408 on the apexes of the respective second protruded portions are not necessarily needed. Rather, the depressed portions 408 serve to make the nipping pressure exerted on the unfixed toner image uniform at a thermally fixing step, because the contact area between the rims 413 surrounding the depressed portions 408 and the inner peripheral surface of the fixing rotating member increases. As a result, images with even better appearance can be formed. Such a resin layer 304b can be obtained by using PEEK as the material for forming the resin layer 304b, for example. In the resin layer 304b made of PEEK, the storage elastic modulus measured at the outer surface delineates a profile indicated in FIG. 8. Specifically, E'(25) is 3.3 GPa, whereas E'(200) is 0.2 GPa, which is lower by a factor of one tenth or more.

With such a rubbing member that has the depressed portions on the apexes of the respective second protruded portions at a temperature of 25° C., and in which the contact area between the rims surrounding the respective depressed portions and the inner peripheral surface of the fixing rotating member becomes relatively larger at a temperature of 200° C., it is possible to better satisfy the requirements for reducing the starting torque and forming electrophotography image with better appearance.

Such a rubbing member may be a rubbing member satisfying the following Requirements (2-i) to (2-iii).

Requirement 2-i

When a glass sheet is pressed against the surface of the fixing rubbing member provided with the second protruded portions, at a pressure of 0.4 MPa at a temperature of 25° C., the rims surrounding the respective depressed portions come into contact with the glass sheet.

Requirement 2-ii

When a glass sheet is pressed against the surface of the fixing rubbing member provided with the second protruded portions, at a pressure of 0.4 MPa at a temperature of 200° C., the rims surrounding the respective depressed portions come into contact with the glass sheet.

Requirement 2-iii

Denoting an average contact area ratio at a temperature of 25° C. as expressed by following Formula (1) as A25, and denoting an average contact area ratio at a temperature of 200° C. as expressed by following Formula (2) as A200, A25<A200 is established.

$$[x1/(x1+y1)]\times 100 \quad (1)$$

In Formula (1),

- x1 denotes an area of the rims coming into contact with the glass sheet at a temperature of 25° C., and
- y1 denotes an area of projections of the respective depressed portions surrounded by the respective rims onto the glass sheet, at a temperature of 25° C.

$$[x2/(x2+y2)]\times 100 \quad (2)$$

In Formula (2),

- x2 denotes the area of the rims coming into contact with the glass sheet, at a temperature of 200° C., and
- y2 denotes an area of projections of the respective depressed portions surrounded by the respective rims onto the glass sheet, at a temperature of 200° C.

Preferably, A200 is twice A25 or more. Given that A25<A200, A200 is preferably from 30% to 85%, and particularly preferably from 40% to 85%. Also given that A25<A200, A25 is preferably from 10% to 50%.

Image Forming Apparatus

An electrophotographic image forming apparatus according to one aspect of the present disclosure (hereinafter, also referred to as an "image forming apparatus") will now be explained with reference to FIG. 1. In the explanation hereunder, an example of an image forming apparatus having a plurality of electrophotographic photosensitive drums and capable of forming color image will be used, but present disclosure is not limited thereto, and is also applicable to a monochromatic image forming apparatus.

The full-color image forming apparatus 1 includes an image reader 2 and an image forming apparatus body 3. The image reader 2 is configured to read an original placed on a platen glass 21. The light emitted from a light source 22 reflects on the original, passes through an optical system member 23 such as a lens, and forms an image on a CCD sensor 24. Such an optical system unit converts an original into a data sequence of electric signals that correspond to each line, by scanning in the direction of the arrow. The image signals obtained by the CCD sensor 24 are sent to the image forming apparatus body 3, and the control unit 30 performs image processing in a manner suitable to each of the image forming units, which will be described later. The control unit 30 also receives an external input from an external host device such as a print server, as an image signal.

The image forming apparatus body 3 includes a plurality of image forming units Pa, Pb, Pc, Pd, and each of the image forming units forms an image on the basis of the image signals described above. In other words, the image signals are converted, by the control unit 30, into a laser beam having been subjected to pulse-width modulation (PWM) control. In FIG. 1, 31 denotes a polygon scanner serving as an exposing device. The polygon scanner 31 scans a laser beam in accordance with to the image signals. With this laser beam, the photosensitive drums 200*a* to 200*d*, each being an image bearing member included in corresponding one of the image forming units Pa to Pd, is irradiated. Pa denotes to a yellow (Y) image forming unit; Pb denotes to a magenta (M) image forming unit; Pc denotes a cyan (C) image forming unit, and Pd denotes a black (Bk) image forming unit. Each of these image forming units forms an image in the color corresponding thereto. Because the image forming units Pa to Pd are substantially the same, the Y image forming unit Pa will be explained in detail, and descriptions of the other image forming units will be omitted. In the Y image forming unit Pa, 200*a* denote a photosensitive drum. On the surface of the photosensitive drum 200*a*, a toner image is formed, on the basis of the image signal, as will be explained below.

201*a* denotes a primary charging device. The primary charging device 201*a* charges the surface of the photosensitive drum 200*a* to a predetermined electric potential, to prepare for the formation of an electrostatic latent image. An electrostatic latent image is then formed on the surface of the photosensitive drum 200*a* having been charged to the predetermined electric potential, by the laser beam from the polygon scanner 31. 202*a* denotes a developing device. The developing device 202*a* forms a toner image by developing the electrostatic latent image on the photosensitive drum 200*a*. 203*a* denotes a transfer roller. The transfer roller 203*a* transfers the toner image on the photosensitive drum 200*a* onto the intermediate transfer belt 204 by discharging the intermediate transfer belt 204 from the rear side, and applying a primary transfer bias having an opposite polarity to that of the toner. The surface of the photosensitive drum 200*a* having the toner image transferred is cleaned by a cleaner 207*a*.

The toner image on the intermediate transfer belt 204 is conveyed into the subsequent image forming unit, and has the toner image of the corresponding color transferred in the image forming unit of that color, in the order of Y, M, C, and Bk, so that a four-color image is formed on the intermediate transfer belt 204. The toner image passed through the Bk image forming unit is secondarily transferred, in a secondary transfer unit including a secondary transfer roller pair 205, 206, onto the recording medium P by being subjected to a secondary transfer electric field having a polarity opposite to the polarity of the toner image on the intermediate transfer belt 204. The recording medium fed from the paper feeder cassette 8 or 9 is kept standby at a registration unit 208. The registration unit then controls the timing to feed the recording medium to match the position of the recording medium to the position of the toner image on the intermediate transfer belt. The toner image on the recording medium is then fixed onto the recording medium by the fixing apparatus 300 that is an image heating device. After the recording medium has passed through the fixing apparatus, the recording medium is discharged outside of the apparatus. For a double-sided printing job, once the toner is transferred and fixed onto a first side (one side) on which an image is to be formed, the recording medium is passed through a reversing unit provided internal of the image forming apparatus subsequent to the fixing, to have the side reversed, has the toner transferred and fixed onto a second surface (the other surface), and is discharged outside of the apparatus and stacked on the discharge tray 7.

EXAMPLES

The present disclosure will now be explained specifically using examples.

The rubbing member and the fixing apparatus according to the present disclosure are not limited to specific configurations in the examples below.

Example A-1

Preparation of Base Material

A base material made of stainless steel (SUS 304) and having a thickness of 1.3 mm, a width of 27.5 mm, and a length of 390 mm in the direction orthogonal to the width direction was prepared.

The first protruded portions were then formed on one surface of the base material by chemical etching. Each of the first protruded portions was configured to have a shape of a circular truncated cone having a diameter of 350 μm on the top surface, a height of 250 μm, a hypotenuse angle of 65°, and a diameter of 584 μm on the bottom surface. As to the plurality of first protruded portions, 8750 first protruded portions were formed in such a manner that the distance between the centers of the top surfaces of the plurality of respective first protruded portions in the X direction and the Y direction of the base material was 1.4 mm.

Formation of Resin Layer

Dispersion liquid of polyether ether ketone (PEEK) (Product Name: VICOTE (registered trademark) F817, manufactured by Victrex plc.) was then prepared. The base material prepared as described above was then coupled to a core, and the dispersion liquid was applied to the base material using a spray gun (Product Name: W-101, manufactured by ANEST IWATA Corporation) while rotating the base material at 200 rpm, to form a film of the dispersion liquid. The base material having the film formed thereon was then placed inside a heating furnace, and heated at a temperature of 120° C. for five minutes to let the film dry, was heated again at a temperature of 400° C. for 15 minutes to sinter the film into a first PEEK resin layer having a thickness of 5 μm.

On the first PEEK resin layer fabricated as described above, dispersion liquid of polyether ether ketone (PEEK) (Product Name: VICOTE (registered trademark) F804, manufactured by Victrex plc.) was then applied using the spray gun (Product Name: W-101, manufactured by ANEST IWATA Corporation) while rotating the base material at 200 rpm, to form a film of the dispersion liquid. The base material having the film formed thereon was then placed inside a heating furnace, and heated at a temperature of 120° C. for five minutes, to let the film dry, and was heated again at a temperature of 400° C. for 15 minutes to sinter the film into a second PEEK resin layer having a thickness of 30 μm. In the manner described above, the resin layer containing PEEK was formed on the side of the base material provided with the first protruded portions. It was then visually confirmed whether the second protruded portions corresponding to the respective first protruded portions on the base material were formed on the surface of the resin layer on the side opposite to the side facing the base material. The resin layer covering the top surface of the first protruded portions had a thickness same as the thickness of the resin layer covering a part of the base material not provided with the first protruded portions.

Formation of Depressed Portions

The depressed portions were then formed at the apexes of the respective second protruded portions by the following method.

The base material covered by the resin layer was then placed on a heat plate (having a length of 600 mm×a width of 600 mm×a thickness of 60 mm) heated to a temperature of 200° C., in such a manner that the heat plate came into contact with the second protruded portions. The base material was then pressed against the heat plate using a heat press (Product Name: 150-ton press, Model: PEF-150, manufactured by KANSAI ROLL Co., Ltd.) so that a pressure of 4 MPa was applied to the second protruded portions, and was kept pressed for 10 minutes. The base material was then released from the press and set in the normal temperature (25° C.). The depressed portions were thus formed on the apexes of the respective second protruded portions, to achieve the rubbing member according to Example A-1.

The rubbing member thus achieved was then subjected to the following evaluation.

Figure 9:
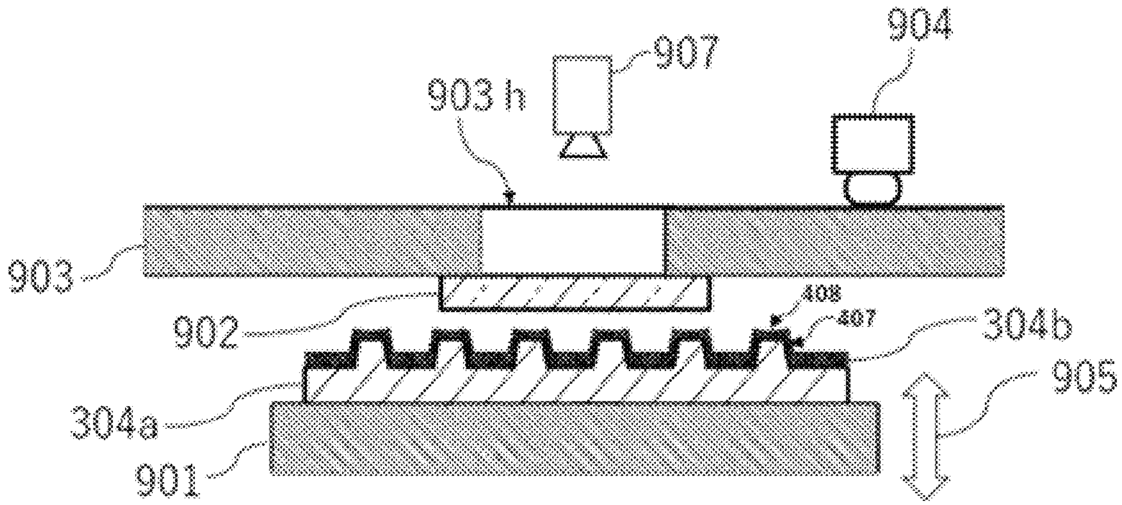
FIG. 9 is a schematic for explaining an apparatus for evaluating a rubbing member.

Evaluation 1 Evaluations of Contact Area Ratios A25 and A200, and Apexes of Second Protruded Portions As illustrated in FIG. 9, a jig having a lower stage 901 having a square shape, each side of which was 400 mm in length, and an upper stage 903 having a square shape, each side of which was 500 mm in length, was prepared. A square hole 903*h* each side of which has a length of 10 mm was provided at the center of the upper stage 903, and a transparent glass sheet 902 was attached to the bottom surface of the upper stage in the vertical direction, so as to close the hole. Each side of the glass sheet was 20 mm in length, and the glass sheet had a thickness of 5 mm. The sheet glass was made of BK7, and both sides of the sheet glass were optically polished surfaces, and had parallelisms within one minute. The lower stage 901 was enabled to move up and down in the direction of the arrow 905, by a lift not illustrated. A load cell 904 was also installed in the jig so that the pressure exerted to the upper stage 903 from below can be measured therewith.

In a temperature environment of 25° C., a subject rubbing member was placed on the lower stage 901 of the jig prepared as described above, with a surface provided with the second protruded portions facing vertically upwards. The lower stage 901 was then lifted vertically upwards, to press the surface having the second protruded portions of the rubbing member against the glass sheet. This upward movement of the lower stage 901 was stopped when the reading of the pressure gauge had reached 0.4 MPa. Through the glass sheet 902 on the opposite side of the side in contact with the rubbing member, the surface was observed using a digital microscope 907 (Product Name: DIGITAL MICROSCOPE VHX-500, manufactured by KEYENCE CORPORATION) at an observation magnification of 200 times, and an image was then captured. Using image analysis software (Product Name: "ImageProPlus", manufactured by Media Cybernetics), a binarized image in which contact regions and non-contact regions between the glass sheet and the rubbing member were distinguishable was then obtained from the captured image. For the binarization processing, Otsu's method disclosed in IEEE Transactions on SYSTEMS, MAN AND CYBERNETICS, vol. SMC-9, No. 1, January 1979, pp 62-66 was used.

It was then determined whether the depressed portions on the apexes of the respective second protruded portions and the rims surrounding the respective depressed portion were found in the binarized image.

Furthermore, on the basis of the determination above, for every one of the contact regions each having a depressed portion on the apex of the corresponding second protruded portion, and for every one of the rims each surrounding the corresponding depressed portion, an area x1 and an area y1 were calculated, respectively. The area x1 is an area of the rims surrounding the respective depressed portions formed as a result of the second protruded portions and the glass sheet coming into contact with each other. The area y1 is an area of the depressed portion not in contact with the glass sheet. The area y1 is an area of the projections of the respective depressed portions, which are surrounded by the respective rims, onto the glass sheet.

A contact area ratio (%) was then calculated for each of the contact regions between the second protruded portion and the glass sheet on the basis of Formula (1) below, and an average of the contact area ratios was then calculated.

$$[x1/(x1+y1)]\times 100 \qquad \text{Formula (1)}$$

The observation using the digital microscope, the acquisition of the binarized image, the determination, the calculations of the contact area ratios and averages were performed at three positions that were at the center in a width direction that is orthogonal to the longitudinal direction of the rubbing member, and at the distances of 90 mm from the center toward the respective ends in the longitudinal direction. An average of the averages of the contact area ratios at the three respective positions was then calculated as a contact area ratio A25 of the subject rubbing member.

The contact area ratio A200 was then calculated in accordance with Formula (2) below, in the same manner as the calculation method of A25, except that the measurement environment temperature was set to 200° C.

$$[x2/(x2+y2)]\times 100 \qquad \text{Formula (2)}$$

In Formula (2), provided that the surface having the second protruded portions of the fixing rubbing member is pressed against the glass sheet at a pressure of 0.4 MPa at a temperature of 200° C., and that the rims surrounding the respective depressed portions are in contact with the glass sheet, x2 denotes an area of the rims coming into contact with the glass sheet at a temperature of 200° C., and y2 denotes an area of the projections of the depressed portions, which are surrounded by the respective rims, onto the glass sheet, at a temperature of 200° C.

Evaluation 2 Measurements of Storage Elastic Moduli of Resin Layer (E'(25), E'(200))

The storage elastic moduli E'(25) and E'(200) of the resin layer of the subject rubbing member were then measured using a dynamic viscoelasticity analyzer (Product Name: Rheogel E4000 manufactured by UBM). Specifically, a test piece having the same composition as the resin layer (a thickness of 20 μm to 40 μm, a width of 5 mm, and a length of 20 mm) was prepared. The test piece is then mounted on the tension jig, and the measurement temperature was raised from 20° C. to 250° C. at a temperature increase speed of 5.0° C. per minute, using the settings of an inter-chuck distance of 10 mm, and a sine wave having a frequency of 10 Hz and an amplitude of 0.03 mm. E'(25) and E'(250) that are the values at the temperature of 25° C. and the temperature of 250° C. were then calculated.

Evaluation 3

Torque Measurement

In this evaluation, a full-color electrophotographic image forming apparatus (Product Name: Image PRESS V1000; manufactured by Canon Inc.) was prepared.

To begin with, 50 ml of a lubricant was applied to the surface of the subject rubbing member having the second protruded portions. The lubricant contained perfluoropolyether (Product Name: Demnum S-200; manufactured by DAIKIN INDUSTRIES, LTD.) as base oil, and also contained 30 mass % of a fluorine resin particle (Product Name: LUBRON L-5F; manufactured by DAIKIN INDUSTRIES, LTD.) with respect to the lubricant, as a thickener. The base oil had a kinematic viscosity of 200 $mm^2/s$ at a temperature of 40° C.

The rubbing member fixed on outer surface of a pad in the fixing apparatus included in the above-mentioned full-color electrophotographic image forming apparatus was then removed, and the subject rubbing member, having been prepared and having the lubricant applied to the surface as described above, was then attached. In the full-color electrophotographic image forming apparatus, the temperature setting of the heater was set to 200° C., and the fixing rotating member was driven in rotation, by rotating the pressing roller for one minute. The full-color electrophotographic image forming apparatus was then powered off, and kept in an environment of a temperature of 25° C. for 24 hours. The full-color electrophotographic image forming apparatus was then power on, and the maximum torque on the shaft of the pressing roller having just started rotating (starting torque) was then measured.

Example A-2

A rubbing member was fabricated in the same manner as for Example A-1, except that the resin layer was formed so that the resin layer in the second protruded portions and the resin layer in the portions other than the second protruded portions both had a thickness of 20 μm. The rubbing member thus obtained was then subjected to Evaluations 1 to 3 described in Example A-1.

Example A-3

A rubbing member was fabricated in the same manner as for Example A-2, except that the dispersion of polyether ether ketone (PEEK), used as a material for forming the resin layer, was changed to a resin liquid dispersed with polytetrafluoroethylene (Product Name: VICOTE F810, manufactured by Victrex plc.). The rubbing member thus obtained was then subjected to Evaluations 1 to 3 described in Example A-1.

Example A-4

A rubbing member was fabricated in the same manner as for Example A-3, except that the resin layer was formed so that the resin layer in the second protruded portions and the resin layer in the portions other than the second protruded portions both had a thickness of 30 μm. The rubbing member thus obtained was then subjected to Evaluations 1 to 3 described in Example A-1.

Example A-5

A rubbing member was fabricated in the same manner as for Example A-3, except that the pressure exerted on the second protruded portions at the step of forming the depressed portions on the apexes of the respective second protruded portions in Example A-4 was set to 3 MPa. The rubbing member thus obtained was then subjected to Evaluations 1 to 3 described in Example A-1.

Example A-6

A rubbing member 304 according to Example A-6 was fabricated in the same manner as Example A-5 except that, in the formation of the resin layer in Example A-5, the ratio of the number of second protruded portions each having the depressed portion at the apex with respect to the total number of second protruded portions (hereinafter, sometimes referred to as a "depressed portion formation ratio") was changed to 80 number %.

Example A-7

A rubbing member 304 according to Example A-7 was fabricated in the same manner as Example A-5 except that, in the formation of the resin layer in Example A-5, the depressed portion formation ratio was changed to 50 number %.

Comparative Example A-1

A rubbing member was fabricated in the same manner as in Example 1 except the step of forming the depressed portion on the apexes of the respective second protruded portions in Example A-1 was omitted. The rubbing member thus obtained was then subjected to Evaluations 1 to 3 described in Example A-1.

The evaluation results of the rubbing members according to Examples A-1 to A-7, and to the Comparative Example A-1 are provided in Table 1.

TABLE 1

| | | Resin Layer Thickness (μm) | | Evaluation 1: Depressed Portions at Apexes of Respective Second Protruded Portions | | | | |
|---|---|---|---|---|---|---|---|---|
| | | Second Protruded Portions | Other than Second Protruded Portions | Presence/ Absence | Ratio of Depressed Portions (number %) | Depth of Depressed Portions (μm) | Area-Corresponding Diameter of Depressed Portions (μm) | A25 (%) |
| Examples | A-1 | 30 | 30 | Presence | 100 | 2 | 370 | 41 |
| | A-2 | 20 | 20 | Presence | 100 | 2 | 375 | 39 |
| | A-3 | 20 | 20 | Presence | 100 | 6 | 455 | 10 |
| | A-4 | 30 | 30 | Presence | 100 | 6 | 450 | 12 |
| | A-5 | 20 | 20 | Presence | 100 | 4 | 440 | 16 |
| | A-6 | 20 | 20 | Presence | 80 | 4 | 440 | 16 |
| | A-7 | 20 | 20 | Presence | 50 | 4 | 440 | 16 |
| Comparative Example A-1 | | 30 | 30 | Absence | 0 | 0 | 0 | ※ |

| | | Evaluation 1 | | Evaluation 2 | | | Evaluation 3 Starting |
|---|---|---|---|---|---|---|---|
| | | A200 (%) | A200/ A25 | E ' 25 (GPa) | E ' 200 (GPa) | E ' 200/ E ' 25 | Torque (kgf · cm) |
| Examples | A-1 | 79 | 1.9 | 4.2 | 0.6 | 0.14 | 180 |
| | A-2 | 83 | 2.1 | 4.1 | 0.5 | 0.12 | 160 |
| | A-3 | 31 | 3.1 | 3.6 | 0.5 | 0.14 | 95 |
| | A-4 | 41 | 3.4 | 3.3 | 0.2 | 0.06 | 100 |
| | A-5 | 56 | 3.5 | 3.3 | 0.2 | 0.06 | 110 |
| | A-6 | 56 | 3.5 | 3.3 | 0.2 | 0.06 | 110 |
| | A-7 | 56 | 3.5 | 3.3 | 0.2 | 0.06 | 130 |
| Comparative Example A-1 | | ※ | ※ | 3.3 | 0.2 | 0.06 | 320 |

※Because the rubbing member according to Comparative Example A-1 did not have any depressed portions on the apex of the second protruded portions, "A25", "A200", and "A200/A25" were not calculated.

As is clear from the results indicated in Table 1, by providing the depressed portions to the apexes of the respective second protruded portions, the starting torque of the fixing apparatus was dramatically reduced.

Example B-1

Using the rubbing member according to Example A-1, a test for fixing an unfixed toner image formed on an OHT film was conducted.

A full-color electrophotographic image forming apparatus with the rubbing member according to Example A-1 mounted on the pad was prepared, in the same manner as in Evaluation 3 in Example A-1. Using this full-color electrophotographic image forming apparatus, an image for melting unevenness was formed on ten sheets of recording medium, using the cyan toner and the magenta toner across the entire surface of an A4-size OHT film (Product Name: VF-1420N, manufactured by KOKUYO Co., Ltd.) at a density of 100%, and was fixed successively.

When the pressure of the fixing rotating member (nipping pressure) is not applied to the depressed portions on the apexes of the second protruded portions of the rubbing member, and results in unevenness in the nipping pressure across the nip portion N, such unevenness sometimes appears as fixing unevenness in the image. Specifically, for example, color unevenness may appear, as a result of the cyan toner and the magenta toner not being molten sufficiently and therefore not becoming mixed sufficiently. From this viewpoint, the image on the tenth sheet was visually observed and evaluated on the basis of the following criteria.

Evaluation Criteria

- Rank A: The image had no observable color unevenness resulting from the unevenness in the nipping pressure.
- Rank B: Only a small part of the image had observable color unevenness resulting from the unevenness in the nipping pressure.
- Rank C: There was prominent color unevenness resulting from the unevenness in the nipping pressure caused by the rims surrounding the depressed portions coming into abutment.

Examples B-2 to B-7

The rubbing members according to Example A-2 to A-7 were subjected to the evaluation described in Example B-1 above.

The results of Examples B-1 to B-7 are indicated in Table 2.

TABLE 2

| | Rank of Evaluation |
|---|---|
| Example B-1 | A |
| Example B-2 | A |
| Example B-3 | B |
| Example B-4 | A |
| Example B-5 | A |
| Example B-6 | A |
| Example B-7 | A |

As indicated in Table 2, Example B-3, which used the rubbing member according to Example A-3 resulted in an evaluation of Rank B. One possible reason is that A200 of the rubbing member according to Example A-3 was 31%, which was less than those of the rubbing members according to Examples A-1 to A-2 and A-4 to A-7, and therefore, the nipping pressure lessened at the center of the depressed portion of each of the second protruded portions, and caused some unevenness in the nipping pressure.

While the present invention has been described with reference to exemplary embodiments, it is to be understood that the invention is not limited to the disclosed exemplary embodiments. The scope of the following claims is to be accorded the broadest interpretation so as to encompass all such modification and equivalent structures and functions.

This application claims the benefit of Japanese Patent Application No. 2024-005503 filed Jan. 17, 2024, which is hereby incorporated by reference herein in its entirety.

What is claimed is:

1. A fixing rubbing member comprising:

a metallic base material having a plurality of first protruded portions on at least one surface; and a resin layer covering a surface of the first protruded portions of the metallic base material, wherein the resin layer is provided with a plurality of second protruded portions corresponding to the plurality of respective first protruded portions, on a surface of the resin layer on an opposite side of a side that faces the metallic base material, an apex of at least one of the plurality of second protruded portions is provided with at least one depressed portion, and when a glass sheet is pressed against the surface of the fixing rubbing member provided with the plurality of second protruded portions, at a pressure 0.4 MPa, at a temperature of 25° C., a rim surrounding the depressed portion comes into contact with the glass sheet.

2. The fixing rubbing member according to claim 1, wherein the depressed portion surrounded by the rim has a depth of 1.0 μm or more.

3. The fixing rubbing member according to claim 1, wherein the depressed portion surrounded by the rim has an area-corresponding diameter of 20 μm to 600 μm.

4. The fixing rubbing member according to claim 1, wherein, when the glass sheet is pressed against the surface of the fixing rubbing member provided with the plurality of second protruded portions, at the pressure 0.4 MPa, at a temperature of 200° C., the rim surrounding the depressed portion comes into contact with the glass sheet.

5. The fixing rubbing member according to claim 4, wherein denoting an average contact area ratio expressed as formula (1) at a temperature of 25° C. as A25, and denoting an average contact area ratio expressed as formula (2) at a temperature of 200° C. as A200, A25<A200 is established:

$$[x1/(x1+y1)]\times 100, \quad (1)$$

where in the formula (1), x1 denotes an area of the rim coming into contact with the glass sheet at the temperature of 25° C., y1 denotes an area of a projection of the depressed portion surrounded by the rim, onto the glass sheet at the temperature of 25° C., $$[x2/(x2+y2)]\times 100, \quad (2)$$

where in the formula (2), x2 denotes an area of the rim coming into contact with the glass sheet at the temperature of 200° C., and y2 denotes an area of a projection of the depressed portion surrounded by the rim onto the glass sheet at the temperature of 200° C.

6. The fixing rubbing member according to claim 5, wherein the A200 is twice the A25 or more.

7. The fixing rubbing member according to claim 6, wherein the A200 is from 40% to 80%.

8. The fixing rubbing member according to claim 5, wherein the A200 is from 30% to 80%.

9. The fixing rubbing member according to claim 5, wherein the A25 is from 10% to 50%.

10. The fixing rubbing member according to claim 1, wherein denoting a storage elastic modulus of the resin layer at a temperature of 25° C. as E'(25), and denoting a storage elastic modulus of the resin layer at a temperature of 200° C. as E'(200), E'(25) is 2.5 GPa to 4.0 GPa, and E'(200) is 0.06 times to 0.13 times E'(25).

11. The fixing rubbing member according to claim 1, wherein the resin layer includes polyether ether ketone.

12. A fixing apparatus configured to fix an unfixed toner image carried on a recording medium onto the recording medium, the fixing apparatus comprising:

a fixing rotating member;

a pressing rotating member disposed facing the fixing rotating member and forming a nip portion with the fixing rotating member;

a rubbing member disposed on an inner side of the fixing rotating member, and having a sliding surface enabled to slide on an inner peripheral surface of the fixing rotating member, with a lubricant disposed between the sliding surface and the inner peripheral surface;

a backup member disposed on the inner side of the fixing rotating member, in a manner nipping the rubbing member and the fixing rotating member with the pressing rotating member, and providing backing to the rubbing member;

a heater configured to heat the fixing rotating member, wherein the rubbing member is the fixing rubbing member according to claim 1, and is disposed in such a manner that a surface of the fixing rubbing member on a side having the plurality of second protruded portions faces the inner peripheral surface of the fixing rotating member.

* * * * *